United States Patent [19]

Allen

[11] 4,008,764
[45] Feb. 22, 1977

[54] CARRIER GAS VAPORIZED SOLVENT OIL RECOVERY METHOD

[75] Inventor: Joseph C. Allen, Bellaire, Tex.

[73] Assignee: Texaco Inc., New York, N.Y.

[22] Filed: July 11, 1975

[21] Appl. No.: 594,983

Related U.S. Application Data

[63] Continuation of Ser. No. 449,136, March 7, 1974, abandoned.

[52] U.S. Cl. .............. 166/266; 166/267; 166/272; 166/274
[51] Int. Cl.² .................. E21B 43/22; E21B 43/24
[58] Field of Search .......... 166/266, 267, 272, 274, 166/305, 306, 75

[56] References Cited
UNITED STATES PATENTS

| | | | |
|---|---|---|---|
| 2,862,558 | 12/1958 | Dixon | 166/272 |
| 2,880,801 | 4/1959 | Crump | 166/266 X |
| 3,157,230 | 11/1964 | Connally, Jr. et al. | 166/274 |
| 3,240,272 | 3/1966 | Orkiszewski | 166/274 |
| 3,354,953 | 11/1967 | Morse | 166/274 |
| 3,442,332 | 5/1969 | Keith | 166/266 |
| 3,459,265 | 8/1969 | Buxton et al. | 166/272 X |
| 3,459,265 | 8/1969 | Buxton et al. | 166/272 X |
| 3,675,715 | 7/1972 | Speller, Jr. | 166/266 X |
| 3,811,506 | 5/1974 | Carlin | 166/274 |
| 3,823,777 | 7/1974 | Allen et al. | 166/266 |
| 3,837,399 | 9/1974 | Allen et al. | 166/266 |
| 3,845,820 | 11/1974 | Allen et al. | 166/266 |

Primary Examiner—Stephen J. Novosad
Assistant Examiner—George A. Suchfield
Attorney, Agent, or Firm—T. H. Whaley; C. G. Ries; Jack H. Park

[57] ABSTRACT

Viscous petroleum may be recovered from viscous petroleum-containing formations including tar sand deposits by injecting into the formation a gaseous mixture of a carrier gas and a solvent which is liquid at reservoir conditions, such as pentane, hexane, heptane, octane, carbon disulfide, etc., and mixtures thereof. The gaseous mixture is formed by contacting a normally liquid solvent with a carrier gas such as nitrogen and introducing the carrier gas having solvent vaporized therein into the formation. Recovery of petroleum and solvent may be from the same well as is used for injection or from a remotely located well. The carrier gas and/or solvent may be heated prior to injection to increase solvency rate and vapor pressure. In throughput operations, the gaseous solvent mixture may be followed by water, hot water or steam to displace the residual solvent from the formation.

21 Claims, 1 Drawing Figure

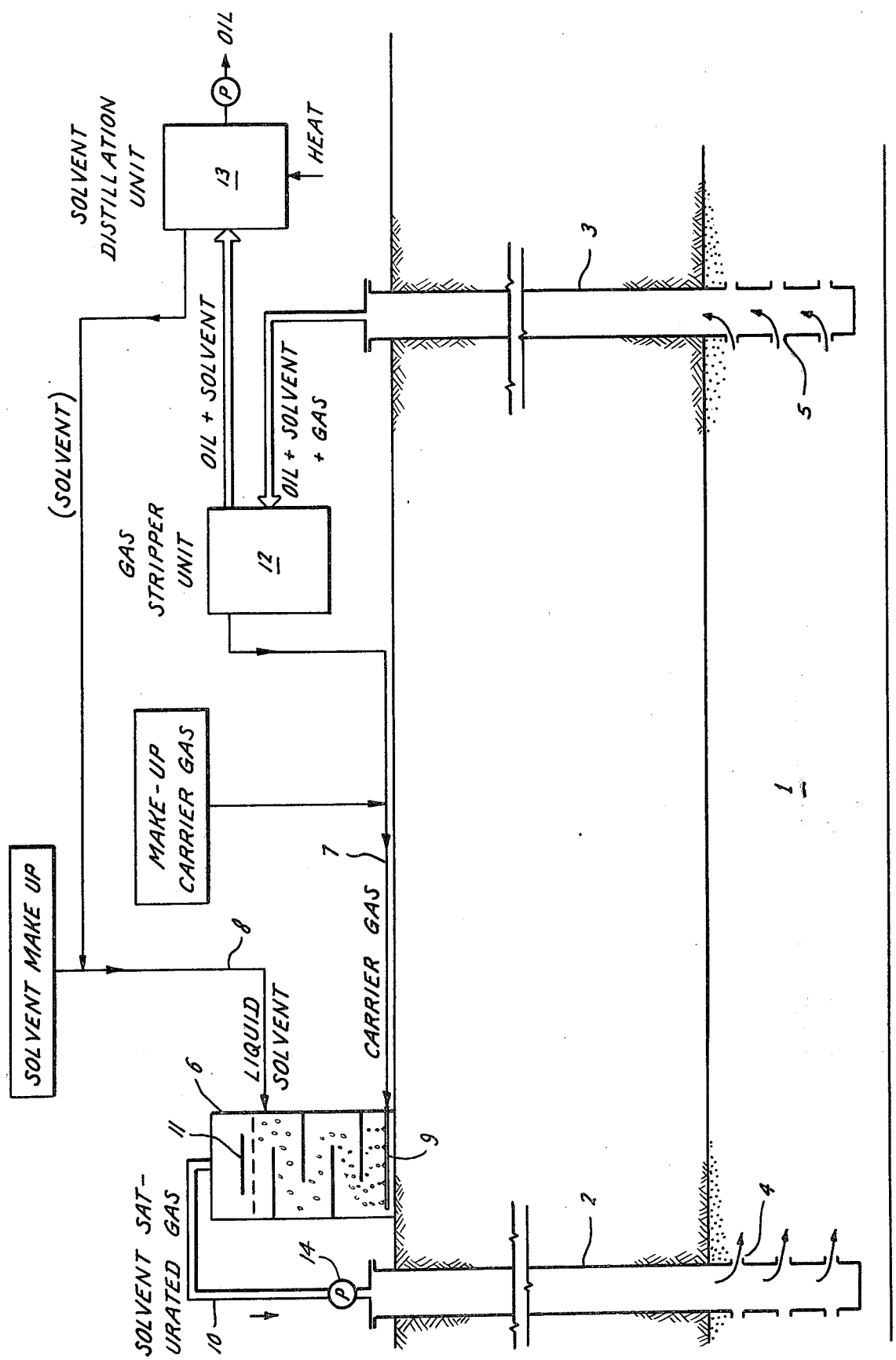

CARRIER GAS VAPORIZED SOLVENT OIL RECOVERY METHOD

This is a continuation, of application Ser. No. 449,136 filed Mar. 7, 1974 now abandoned.

BACKGROUND OF THE INVENTION

I. Field of the Invention

This invention is concerned with a method for recovering viscous petroleum including bitumen from viscous petroleum-containing formations including tar sand deposits, and more particularly is concerned with an improved carrier gas vaporized solvent flooding method especially useful in viscous petroleum-containing formations including tar sand deposits.

II. Description of the Prior Art

There are many subterranean petroleum-containing formations in various parts of the world from which petroleum cannot be recovered by conventional means because the petroleum is too viscous to flow or be pumped. The most extreme example of viscous petroleum-containing formations are the so-called tar sand or bituminous sand deposits. The largest and most famous such formation is the Athabasca Tar Sand Deposit in the northeastern part of the Province of Alberta, Canada, which contains over 700 billion barrels of petroleum. Other extensive deposits are known to exist in the western United States and in Venezuela, and smaller deposits exist in Europe and Asia.

Tar sands are defined as sand saturated with a highly viscous crude petroleum material not recoverable in its natural state through a well by ordinary production methods. The petroleum constituent of tar sand deposits are highly bituminous in character and very viscous. The sand present in tar sand deposits is generally fine quartz sand coated with a layer of water, with the bituminous petroleum material occupying most of the void space around the water wetted sand grains. The balance of the void space is filled with connate water, and some deposits contain small volumes of gas such as air or methane. The sand grains are packed to a void volume of about 35 percent, which corresponds to 83 percent by weight sand. The balance of the material is bitumen and water, and the sum of bitumen and water is fairly consistently 17 percent by weight, with the bitumen portion thereof varying from about 2 percent to about 16 percent. One of the characteristics of tar sand deposits which differs considerably from conventional petroleum-containing formations is the absence of a consolidated material matrix within the formation. The sand grains are generally in contact although mostly uncemented and the bitumen occupies most of the void space. The API gravity of the bitumen ranges from about 6 to about 8, and the specific gravity at 60° F. is from about 1.006 to about 1.027 and the viscosity is in the millions of centipoise range at formation temperature.

The methods for recovering bituminous petroleum from tar sand deposits are classified as strip mining and in situ separation processes. Most of the recovery to date has been by means of strip mining, although this method is economically feasible at the present time only when the ratio of overburden thickness to tar sand deposit thickness is around 1 or less. Vast quantities of petroleum are known to exist in the form of tar sand deposits which are not within a range which is economically suitable for strip mining, and so there is a serious need for some form of in situ process wherein the bitumen or bituminous petroleum is separated from the sand by some means and recovered therefrom through a well or other production means drilled into the tar sand deposit.

In situ separation processes described in the literature include thermal techniques, such as fire flooding (or in situ combustion) and steam flooding, and emulsification drive processes. To be successful, an in situ separation process must accomplish two functions: the viscosity of the crude oil must be reduced and some form of oil displacement or driving mechanism must be supplied to the formation. Emulsification processes frequently also employ steam, plus a basic material such as sodium hydroxide which induces formation of an oil-in-water emulsion having a viscosity substantially lower than the viscosity of the formation petroleum. Thermal processes are restricted to formations having sufficient overburden thickness to tolerate injection of high pressure fluids. Many tar sand deposits exist in which the overburden thickness is too thin for thermal flooding and too thick for strip mining.

One other possible process for recovering bitumen from tar sand deposits by in situ separation which does not require the presence of sufficient overburden thickness to contain high pressures, is solvent flooding. Solvent flooding involves injection of a solvent into the tar sand deposit, which solvent dilutes and reduces the viscosity of the bituminous petroleum to render it mobile and recoverable by means of a well as is normally employed in conventional oil recovery operations. Although many solvents including aromatic hydrocarbons such as benzene, toluene and xylene, as well as carbon tetrachloride and carbon disulfide, readily dissolve bituminous petroleum, these materials are expensive and since huge quantities are required, solvent flooding has not been considered to be economically feasible. Paraffinic hydrocarbons such as ethane, propane, butane, pentane, etc. are more readily available and less expensive than those solvents described above, but it has always been uniformly assumed by persons skilled in the art that paraffinic hydrocarbon solvents could not be used in bituminous petroleum because of the danger of precipitating asphaltenes, which would cause formation plugging. Indeed, the asphaltic constituents of crude oil are frequently defined as pentane insoluble materials. Asphalt removal from oil by contacting the crude with propane is a well known refinery process. Furthermore, the cost of solvent flooding has always been considered prohibitive because of the vast quantities required to saturate the formation.

It can be seen from the foregoing that there is a substantial need for a method for recovering viscous petroleum such as bitumen or bituminous petroleum from tar sand formations by use of moderate quantities of readily available, inexpensive solvents in a relatively low pressure procedure that can be used in intermediate depth deposits as well as in deep deposits.

SUMMARY OF THE INVENTION

I have discovered, and this constitutes my invention, that viscous petroleum including bitumen may be recovered from viscous petroleum-containing formations including tar sand deposits by injecting into the formation a gaseous mixture of a carrier gas and a hydrocarbon solvent which is liquid at reservoir conditions. Suitable materials for the solvent include paraffinic hydrocarbons having from five to ten carbon atoms such as pentane, hexane, etc., as well as naphtha, natural gasoline, carbon disulfide, and mixtures thereof. Suitable carrier gases include nitrogen, carbon dioxide, methane, ethane, propane, butane, hydrogen, anhydrous ammonia, hydrogen sulfide, ethylene or propylene. For example, nitrogen may be passed through a vaporizer to vaporize pentane, and then the gaseous mixture injected into a subsurface tar sand deposit. Viscous petroleum or bitumen absorbs the liquid solvent from the gaseous phase until sufficient solvent is absorbed to make the petroleum sufficiently mobile that it will flow into the production well. Production may be taken from a remotely located well or from the same well as was used for injecting the gas-solvent mixture. Surprisingly, the use of paraffinic hydrocarbons such as pentane or hexane in application of this process to tar sand materials does not result in plugging of formation flow channels caused by precipitation of asphaltic materials. The carrier gas and/or the solvent may be heated prior to injection into the formation to increase the solvency rate and vapor pressure of the solvent. The solvent may be displaced by injecting water, hot water or steam into the formation.

BRIEF DESCRIPTION OF THE DRAWING

The attached drawing shows a tar sand formation being subjected to the process of my invention with provisions on the surface for recycling solvent and carrier gas produced along with the crude petroleum.

DESCRIPTION OF THE PREFERRED EMBODIMENTS

I. The Process

The process of my invention comprises non-aqueous gaseous fluid injection operation necessitating at least one well drilled into and in fluid communication with the petroleum formation. A carrier gas such as nitrogen is brought in contact with and vaporizes an effective solvent which is normally liquid at reservoir conditions and the gaseous mixture is injected via the injection well into the formation.

The reasons for using a carrier gas to vaporize the normally liquid solvent are many fold. By using this procedure, the advantages of gaseous solvents and of liquid solvents can be combined. Higher molecular weight, liquid solvents are more effective solvents for high molecular weight, hydrocarbon components of viscous petroleum than lower molecular weight process gaseous solvents. Also, troubles sometimes encountered in using liquid solvents such as rapid loss of solvent injectivity due to creation of a viscous bank of the solvent-petroleum mixture which eventually becomes immobile is avoided. Injection of a permanent (non-condensible) gas with the solvent increases and maintains a high pressure which increases oil production rate and recovery. The diffusivity of gases is much higher than liquids, which speeds up the penetration rate throughout the formation and increases overall conformance. Finally, the total inventory of solvent in the formation is reduced materially when gaseous solvent mixture is used as compared to liquid solvent. This inventory reduction is especially significant in the process of my invention, since only a portion of the gas injected into the formation is solvent, the major portion thereof being the less expensive carrier gas.

The preferred method for practicing the process of my invention involves the use of a contactor vessel such as a vaporizer, in which the carrier gas can contact liquid solvent. This can be accomplished by bubbling the carrier gas through a vessel partly filled with the liquid solvent. Baffles in the vessel improve the efficiency of the vaporization step, and many other types of commercially available devices such as multi-tray vaporizers, moving film contactors, etc. may be used.

The process is best understood by referring to the illustrative embodiment in the attached drawing, in which viscous petroleum-containing formation 1 is penetrated by injection well 2 and production well 3. Perforations 4 and 5 establish fluid communication between the wells and the formation 1. On the surface, vaporizer 6 is fed by carrier gas via line 7 and by liquid solvent through line 8. Initially, all of the liquid solvent and carrier gas will be supplied from external makeup sources, although recycling of both produced solvent and carrier gas reduces inventory of these fluids. Solvent is thereafter added to vaporizer 6 only as needed to maintain the level up to a preselected level. Carrier gas is bubbled into the liquid solvent via nozzles 9, so that a uniform distribution of gas bubbles in the liquid is achieved to insure maximum gas-liquid solvent contact. The gaseous phase is saturated with solvent vapors, and only gaseous materials are allowed to exit through line 10. Baffles 11 aid in achieving efficient mixing and prevent liquid solvent from exiting the vaporizer.

The gaseous effluent from vaporizer 6, comprising carrier gas and vaporized solvent, passes via line 10 and is pumped by compressor 14 into injection well 2. The gaseous mixture of carrier gas and solvent enter the formation and flows through the flow channels in the formation. Solvent is absorbed directly into the viscous petroleum from the gaseous phase. The carrier gas serves the essential additional purpose of maintaining transmissibility by maintaining the formation flow channels open.

As the viscous petroleum gaseous solvent, the viscosity thereof decreases until flow of petroleum is initiated. Contact between solvent and viscous petroleum is achieved in a very uniform manner throughout the formation between the injection well and the production well, as contrasted to liquid solvent injection where maximum solvent-petroleum mixing occurs near the injection well, with much of the petroleum between the contact point and the production well being essentially uncontacted by solvent.

The petroleum-solvent mixture flows toward production well 3 being driven by the injected gas. The fluid enters well 3 via perforations 5, and is pumped to the surface. Some carrier gas is produced simultaneously with petroleum and solvent. It is usually desirable to separate the gas and petroleum by means such as gas stripper 12. The stripped gas is recycled through vaporizer 6. The produced fluid then passes through a solvent separator unit. Thermal distillation unit 13 accomplishes the separation in this embodiment. Solvent recycling is desirable for economic reasons. If a central surface processing plant is to be used, as will be the case for tar sand operations, for example, the separation of solvent from the petroleum may be accomplished in the central processing plant.

After the process described above has proceeded for a period of time, gas-solvent injection can be terminated and a drive fluid such as water, hot water or steam may be injected to displace the residual petroleum and solvent toward the production well.

In a slightly different embodiment, the carrier gas and/or the liquid solvent is heated, so that the gaseous mixture of carrier gas and solvent enter the formation at a temperature above ambient temperature. If desired, the temperature may be higher than the temperature of the petroleum-containing formation so as to achieve a limited amount of thermal petroleum viscosity reduction.

After completion of the oil operation, residual solvent may be recovered from the formation by any of several means. If a water, hot water or steam injection drive step is used as described above, usually no additional step is required to recover residual solvent. If no such aqueous drive fluid injection step is used, however, solvent may be recovered by injecting a gaseous material, either the same gas used as a carrier gas or any other available non-condensable gas, into the formation to scavenge by veporization the residual solvent from the formation.

The process of my invention may also be used in a push-pull, single well recovery process, wherein the gaseous mixture of carrier gas and solvent are injected into the formation for a period of time, until the gaseous mixture has penetrated for some distance into the formation, and the injection pressure has begun increasing, followed by reduction of pressure and termination of injection of gas so petroleum and absorbed solvent can flow into the well bore.

II. The Liquid Solvent

Any material which is essentially all liquid at the temperature and pressure in the petroleum formation, and (2) which is absorbed by the formation petroleum from the gaseous phase, and (3) as a result of such absorption the viscosity of the petroleum is reduced, may be used in the process of my invention. Surprisingly, I have found that paraffinic hydrocarbons are the preferred solvents. Any paraffinic hydrocarbon having from about five to about ten carbon atoms or more may be used. Linear or branched chain species may be used, and mixtures of numerous types are satisfactory solvents. Commercial blends such as naphtha or natural gasoline may be used. Carbon disulfide, $CS_2$, alone or mixed with paraffinic hydrocarbon solvents are also effective. Aromatic hydrocarbons such as benzene have not been found to be satisfactory. This is an especially unexpected result since such materials are normally considered to be preferred solvents especially for asphaltic petroleum such as is found in tar sands.

III. The Carrier Gas

Any material which is essentially all gaseous at formation temperature and pressure, and which is unreactive with the liquid solvent being used, may be used as the carrier gas. Nitrogen is very suitable for use as the carrier gas in my process. Air may also be used, but precautions must be taken when using a flammable liquid solvent to avoid fire or explosion dangers. Gaseous paraffinic materials such as methane, ethane or propane, as well as gaseous, olefinic hydrocarbons such as ethylene or propylene may also be used. Carbon dioxide is another preferred carrier gas. Hydrogen sulfide may also be used if precautions are taken to prevent escape of the material into the atmosphere at the production well. Hydrogen or anhydrous ammonia may also be used. Crude materials such as natural gas, flue gas, exhaust gas, etc. may also be used, although some processing step to remove particulate matter and corrosive materials is advised. Mixtures of any two or more of the foregoing materials may also be used.

Ordinarily, there is no need to regulate the ratio of carrier gas and solvent. Generally, the preferred method of operating comprises saturating or essentially saturating the carrier gas with solvent at the operating conditions.

IV. Field Example

In order to better understand the process of my invention the following pilot field example is offered as an illustrative embodiment of my invention; however, it is not meant to be limitative or restrictive thereof.

A tar sand deposit is located at a depth of 200 feet and the thickness of the deposit is 70 feet. Since the ratio of overburden thickness to tar sand deposit thickness is greater than one, the deposit is not economically suitable for strip mining. It is determined that the most attractive method of exploiting this particular reservoir is by means of carrier gas vaporized solvent flooding.

A commercial grade natural gasoline is available at an attractive price in the area, the composition of this material being 90 percent $C_6$ through $C_9$. This material is essentially all liquid at reservoir pressure and temperature, so it is quite suitable for use as the liquid solvent.

Flue gas available from a steam generator operating nearby in the field is passed through a filter and a scrubber to remove particulate matter and corrosive materials, and the scrubbed flue gas, which is approximately 86 percent nitrogen and 14 percent carbon dioxide, is used as the carrier gas.

A multiple baffle gas vaporizer unit capable of handling 50,000 standard cubic feet of gas per hour is installed near the injection well and connecting lines are added so that carrier gas and liquid solvent may be introduced into the vaporizer and gaseous effluent pumped to the injection well. The nitrogen-carbon dioxide carrier gas and the solvent are both heated to a temperature of 120° F. prior to introduction thereof into the vaporizer. The gaseous effluent is compressed to a pressure of 150 pounds per square inch and injected into the formation. Production of carrier gas is obtained within 20 days from the production well, which is located 100 feet from the injection well. Oil production begins 10 days after the carrier gas first appeared. Produced gas comprising the injected carrier gas and a small amount of methane is stripped from the produced fluid and recycled through the vaporizer unit. Solvent is removed from the produced fluid by distillation for recycling through the vaporizer.

After production has continued for 12 months, the gas-oil ratio begins to rise. Gas analysis indicates that the solvent content thereof is beginning to increase, indicating absorption of solvent by formation petroleum has reached an equilibrium. Gaseous fluid injection is terminated and hot water is injected into the injection well to displace additional petroleum and solvent. The petroleum production rate increases rapidly and remains high for several months, and then decreases as the injected hot water begins to break through. The injection of hot water is stopped after the water-oil ratio rises above about 50.

V. Experimental Section

In order to demonstrate the operability of the process of my invention, and further to determine the magnitude of oil recovery resulting from the application of several specific embodiments thereof, the following laboratory experimental work was performed.

A glass tube measuring approximately ¾ inch in diameter and two feet in length was filled with loosely packed tar sand material obtained from a strip mining operation in the Athabasca Tar Sand Deposit. The tube containing the tar sand material was mounted at a 45° angle. The liquid solvents to be evaluated were placed in an efficient contactor and nitrogen was bubbled through the liquid solvents at atmospheric pressure. The nitrogen carrier gas was thereby saturated with the solvent being evaluated, and the gaseous mixture was then passed through the tube packed with tar sand material. The gaseous mixture entered the tube at a pressure only slightly above atmospheric pressure. No back pressure or restriction was applied to the outlet end of the tube. The data obtained are summarized in Table I below.

Table I

| Run | Oil Recovery Using Carrier Gas Vaporized Solvents | |
|---|---|---|
| | Liquid Solvent | % Recovery |
| A | Benzene ($C_6H_6$) | 0 |
| B | Carbon Disulfide ($CS_2$) | 25 |
| C | Light Naphtha (equiv. to $C_9H_{20}$) | 28 |
| D | Hexane ($C_6H_8$) | 71 |

It can be seen from the data contained in Table I above that benzene (Run A) was ineffective for recovering bituminous petroleum from a tar sand material using this process. This is somewhat surprising since benzene is normally considered to be a preferred solvent for bitumen. Carbon disulfide was effective. The light naphtha was superior to carbon disulfide, which is unexpected. Hexane is the most effective solvent of those tested, which is quite surprising. No plugging due to asphaltic material precipitation was apparent during any of these tests. In the case of using carrier gas vaporized carbon disulfide, naphtha and hexane, the petroleum-solvent extract flowed out of the tube by gravity drainage alone.

While my invention has been described in terms of a number of specific illustrative embodiments, it is not so limited, since many variations thereof will be apparent to persons skilled in the related art without departing from the true spirit and scope of my invention. Similarly, while a mechanism has been proposed to explain the benefits derived from application of the process of my invention, it is not hereby asserted that this is the only mechanism responsible therefor. It is my intention that my invention be limited and restricted only by such limitations and restrictions as appear in the appended claims.

I claim:

1. A method for recovering viscous petroleum including bitumen from subterranean, viscous petroleum-containing formations including tar sand deposits, the formation being penetrated by at least one production well and by at least one injection well, both wells being in fluid communication with the formation, comprising:
   a. passing an inert carrier gas which is gaseous at formation temperature and pressure through a solvent for petroleum which is liquid at formation temperature and pressure to vaporize the solvent thereby forming a gaseous mixture of the solvent and carrier gas;
   b. introducing the gaseous mixture of carrier gas and solvent into the formation via the injection well; and
   c. recovering a produced fluid comprising formation petroleum, having solvent absorbed therein and the carrier gas from the production well.

2. A method as recited in claim 1 wherein the solvent is selected from the group consisting of paraffinic hydrocarbons having from five to ten carbon atoms, carbon disulfide, naphtha, natural gasoline, and mixtures thereof.

3. A method as recited in claim 2 wherein the solvent is pentane.

4. A method as recited in claim 2 wherein the solvent is heptane.

5. A method as recited in claim 2 wherein the solvent is naphtha.

6. A method as recited in claim 2 wherein the solvent is natural gasoline.

7. A method as recited in claim 2 wherein the solvent is carbon disulfide.

8. A method as recited in claim 1 wherein the solvent is hexane.

9. A method as recited in claim 1 wherein the carrier gas is selected from the group consisting of nitrogen, air, methane, natural gas, ethane, propane, butane, ethylene, propylene, carbon dioxide, flue gas, exhaust gas, hydrogen sulfide, hydrogen, anhydrous ammonia, and mixtures thereof.

10. A method as recited in claim 9 wherein the carrier gas is nitrogen.

11. A method as recited in claim 9 wherein the carrier gas is methane.

12. A method as recited in claim 9 wherein the carrier gas is carbon dioxide.

13. A method as recited in claim 9 wherein the carrier gas is ethane.

14. A method as recited in claim 9 wherein the carrier gas is flue gas.

15. A method as recited in claim 1 wherein the mixture of carrier gas and solvent is introduced into the formation at a temperature greater than surface ambient temperature.

16. A method as recited in claim 1 wherein the mixture of carrier gas and solvent is introduced into the formation at a temperature at least equal to the formation temperature.

17. A method as recited in claim 1 comprising the additional step of introducing a drive fluid selected from the group consisting of water, hot water and steam into the formation after termination of introduction of the mixture of solvent and carrier gas.

18. A method as recited in claim 1 comprising the additional step of introducing a non-condensable gaseous fluid into the formation to recover solvent retained by the formation.

19. A method as recited in claim 1 comprising the additional step of separating the carrier gas from the produced fluid.

20. A method as recited in claim 1 comprising the additional step of separating the solvent from the produced fluid.

21. A method for recovering viscous petroleum including bitumen from a subterranean, viscous petroleum-containing formation including a tar sand deposit, the formation being penetrated by at least one production well and by at least one injection well, both wells being in fluid communication with the formation, comprising:
   a. passing an inert carrier gas which is gaseous at formation temperature and pressure selected from the group consisting of hydrogen, anhydrous ammonia and mixtures thereof, through a solvent for petroleum which is liquid at formation temperature and pressure to vaporize the solvent thereby forming a gaseous mixture of the solvent and carrier gas;

b. introducing the gaseous mixture of carrier gas and solvent into the formation via the injection well; and c. recovering a produced fluid comprising formation petroleum having solvent absorbed therein, and the carrier gas from the production well.

* * * * *